(12) United States Patent
Doemling et al.

(10) Patent No.: US 12,044,546 B2
(45) Date of Patent: Jul. 23, 2024

(54) DEFORMATION CORRECTION OF A DIGITAL MAP FOR A VEHICLE

(71) Applicant: Bayerische Motoren Werke Aktiengesellschaft, Munich (DE)

(72) Inventors: Maximilian Doemling, Shanghai (CN); Hai Jin, Shanghai (CN); Bill Lv, Shanghai (CN); Tomas Xu, Shanghai (CN)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 825 days.

(21) Appl. No.: 16/958,212

(22) PCT Filed: Dec. 27, 2017

(86) PCT No.: PCT/CN2017/118904
§ 371 (c)(1),
(2) Date: Jun. 26, 2020

(87) PCT Pub. No.: WO2019/127078
PCT Pub. Date: Jul. 4, 2019

(65) Prior Publication Data
US 2020/0348140 A1     Nov. 5, 2020

(51) Int. Cl.
*G01C 21/00* (2006.01)
*G06F 16/29* (2019.01)

(52) U.S. Cl.
CPC ..... *G01C 21/3819* (2020.08); *G01C 21/3867* (2020.08); *G01C 21/387* (2020.08); *G06F 16/29* (2019.01)

(58) Field of Classification Search
CPC ............ G01C 21/3819; G01C 21/3867; G01C 21/387; G01C 21/3804; G06F 16/29
See application file for complete search history.

(56) References Cited

U.S. PATENT DOCUMENTS 7,460,120 B2 * 12/2008 Yoshida ............. G01C 21/3638
345/651
2004/0066376 A1 * 4/2004 Donath ................ G01C 21/365
345/169

(Continued)

FOREIGN PATENT DOCUMENTS

| CN | 103616032 A | 3/2014 | |
| CN | 105206108 A | 12/2015 | |
| DE | 4235285 A1 * | 4/1994 | ............... F41G 3/04 |

OTHER PUBLICATIONS

English Translation of DE-4235285-A1.*

(Continued)

*Primary Examiner* — Rami Khatib
*Assistant Examiner* — Gabriel Joseph Rene Lambert
(74) *Attorney, Agent, or Firm* — Crowell & Moring LLP

(57) ABSTRACT

A method and an apparatus for correcting deformation of a digital map for a vehicle, includes loading a related part from the digital map; determining whether the related part includes road coordinate information in a first zone and road coordinate information in a second zone, wherein the road coordinate information in the first zone is associated with a first Cartesian coordinate system and the road coordinate information in the second zone is associated with a second Cartesian coordinate system; transforming the road coordinate information in the second zone to the first Cartesian coordinate system, if the related part includes the road coordinate information in the first zone and the road coordinate information in the second zone; and generating a corrected map by combining the road coordinate information in the first zone and the transformed road coordinate information in the second zone; wherein the first Cartesian coordinate system is the coordinate system of the vehicle for processing the road coordinate information.

16 Claims, 12 Drawing Sheets

(56) References Cited

U.S. PATENT DOCUMENTS

| | | | |
|---|---|---|---|
| 2005/0159886 A1* | 7/2005 | Kim .................... | G01C 21/387 340/995.14 |
| 2007/0200845 A1* | 8/2007 | Kumagai ........... | G01C 21/3819 345/419 |
| 2010/0098295 A1* | 4/2010 | Zhang .................. | G08G 1/165 348/148 |
| 2010/0118025 A1* | 5/2010 | Smith .................. | G06Q 30/02 345/418 |
| 2010/0197219 A1* | 8/2010 | Issa ........................ | H04W 4/60 455/418 |
| 2013/0158871 A1* | 6/2013 | Joh ........................ | G01C 21/28 703/2 |
| 2017/0103588 A1* | 4/2017 | Rajani ..................... | G06N 5/04 |

OTHER PUBLICATIONS

International Search Report (PCT/ISA/210) issued in PCT Application No. PCT/CN2017/118904 dated Sep. 14, 2018 (three (3) pages).

Written Opinion (PCT/ISA/237) issued in PCT Application No. PCT/CN2017/118904 dated Sep. 14, 2018 (three (3) pages).

\* cited by examiner

DEFORMATION CORRECTION OF A DIGITAL MAP FOR A VEHICLE

FIELD OF THE INVENTION

The present disclosure relates in general to the field of the advanced driving assistant system (ADAS) or highly automatic driving (HAD), and more particularly, to a method and an apparatus for correcting deformation of a digital map for a vehicle.

BACKGROUND OF THE INVENTION

Automatic vehicle driving has long been the subject of research efforts designed to improve the safety and efficiency of automobile transportation. With the boom in automated vehicle driving, the digital map (e.g. the high definition (HD) map) is extremely important for localization during road test. When a vehicle is performing automated driving on a road, it needs to load the surrounding road information from the HD map for localization and trajectory planning.

In the current HD map coordinate system, there are two ways to record road positions. One way is to record localization information (e.g. GPS information) of each point directly in the HD map. However, the disadvantage of recording GPS information directly is that it is inconvenient to calculate relative positions between the vehicle and surroundings. Another way is to use other formats (e.g. OpenDRIVE map format) which contain Cartesian coordinates of points transformed from localization information using the Gauss-Krueger projection. Nevertheless, the Cartesian coordinates transformed using Gauss-Krueger projection are based on different center lines for points in different zones. Therefore, the Cartesian coordinates are only local coordinates in each zone, which may cause discontinuity and distortion of coordinates when moving through two neighboring zones. Additionally, some map producers use one center line to do projection for points in one local HD map, but the violent change of coordinates will be very large when the point is far from the center line.

Accordingly, there is a need in the art to have a solution that can address the problem of distortion at the edge of two neighboring zones.

SUMMARY OF THE INVENTION

The present disclosure aims to provide a method and an apparatus for correcting deformation of a digital map for a vehicle. Such method and apparatus may remove distortion at the edge of two neighboring zones and maximize the accuracy of the HD map both inside and outside the transition area, thereby road information in the HD map will be smooth when driving across different zones.

In accordance with a first exemplary embodiment of the present disclosure, there is provided a method for correcting deformation of a digital map for a vehicle. The method may comprise: loading a related part from the digital map; determining whether the related part includes road coordinate information in a first zone and road coordinate information in a second zone, wherein the road coordinate information in the first zone is associated with a first Cartesian coordinate system and the road coordinate information in the second zone is associated with a second Cartesian coordinate system; transforming the road coordinate information in the second zone to the first Cartesian coordinate system, if the related part includes the road coordinate information in the first zone and the road coordinate information in the second zone; and generating a corrected map by combining the road coordinate information in the first zone and the transformed road coordinate information in the second zone; wherein the first Cartesian coordinate system is the coordinate system of the vehicle for processing the road coordinate information.

In accordance with a second exemplary embodiment of the present disclosure, there is provided an apparatus for correcting deformation of a digital map for a vehicle. The apparatus may comprise: a loading unit configured to load a related part from the digital map; a determination unit configured to determine whether the related part includes road coordinate information in a first zone and road coordinate information in a second zone, wherein the road coordinate information in the first zone is associated with a first Cartesian coordinate system and the road coordinate information in the second zone is associated with a second Cartesian coordinate system; a transformation unit configured to transform the road coordinate information in the second zone to the first Cartesian coordinate system, if the related part includes the road coordinate information in the first zone and the road coordinate information in the second zone; and a generation unit configured to generate a corrected map by combining the road coordinate information in the first zone and the transformed road coordinate information in the second zone, wherein the first Cartesian coordinate system is the coordinate system of the vehicle for processing the road coordinate information.

In accordance with a third exemplary embodiment of the present disclosure, there is provided an apparatus for correcting deformation of a digital map for a vehicle. The apparatus may comprise a memory with computer executable instructions stored therein and a processor coupled to the memory and configured to: load a related part from the digital map; determine whether the related part includes road coordinate information in a first zone and road coordinate information in a second zone, wherein the road coordinate information in the first zone is associated with a first Cartesian coordinate system and the road coordinate information in the second zone is associated with a second Cartesian coordinate system; transform the road coordinate information in the second zone to the first Cartesian coordinate system, if the related part includes the road coordinate information in the first zone and the road coordinate information in the second zone; and generate a corrected map by combining the road coordinate information in the first zone and the transformed road coordinate information in the second zone; wherein the first Cartesian coordinate system is the coordinate system of the vehicle for processing the road coordinate information.

In accordance with a fourth exemplary embodiment of the present disclosure, there is provided a non-transitory machine readable storage medium having instructions stored thereon that, when executed, cause a processor to implement a method for correcting deformation of a digital map for a vehicle according to the present disclosure.

In accordance with a fifth exemplary embodiment of the present disclosure, there is provided a vehicle comprising an apparatus for correcting deformation of a digital map for a vehicle according to the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

The above and other aspects and advantages of the present disclosure will become apparent from the following detailed description of exemplary embodiments taken in conjunction with the accompanying drawings which illustrate, by way of example, the principles of the present disclosure. Note that the drawings are not necessarily drawn to scale.

DETAILED DESCRIPTION

In the following detailed description, numerous specific details are set forth to provide a thorough understanding of the described exemplary embodiments. It will be apparent, however, to one skilled in the art that the described embodiments can be practiced without some or all of these specific details. In other exemplary embodiments, well known structures or process steps have not been described in detail in order to avoid unnecessarily obscuring the concept of the present disclosure.

The term "vehicle" used through the specification refers to a car, an airplane, a helicopter, a ship, or the like. The term "A or B" used through the specification refers to "A and B" and "A or B" rather than meaning that A and B are exclusive, unless otherwise specified.

Figure 1:
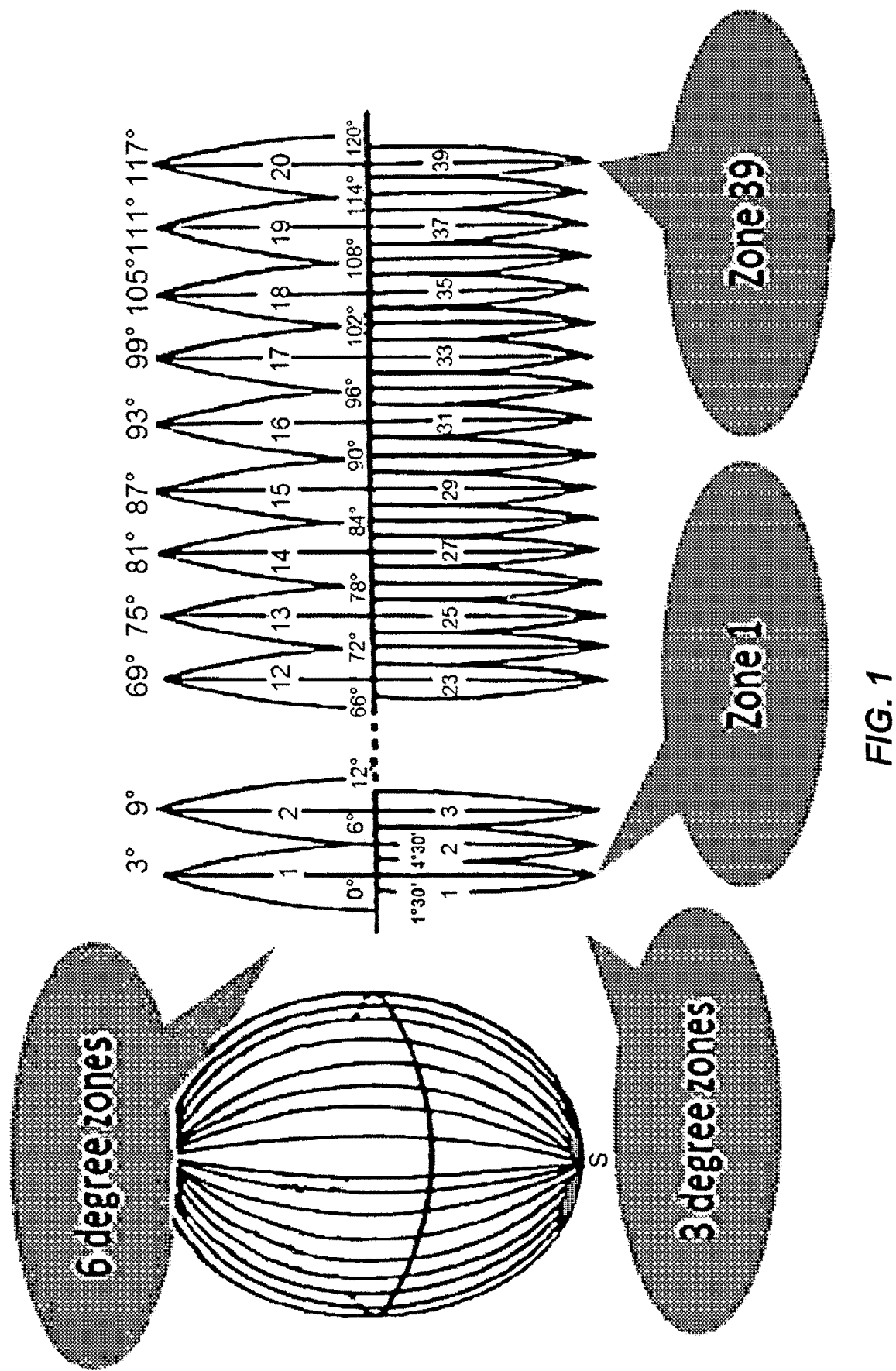
FIG. 1 illustrates zone number ordering on the earth surface in accordance with an exemplary embodiment of the present disclosure.

The Gauss-Krueger projection is now the most widely used projection in accurate large scale mapping. It is often used to transform the ellipsoid surface of the earth to a planar map. For example, any point in the earth surface may be projected to a point in a projection plane using the Gauss-Krueger projection. In order to provide more accurate map information, the earth surface may be divided into 60 or 120 zones. FIG. 1 illustrates zone number ordering on the earth surface in accordance with an exemplary embodiment of the present disclosure. As shown in FIG. 1, the earth surface may be divided into 60 6-degree zones or 120 3-degree zones. Such dividing is also known as zone-dividing of Gauss-Krueger projection. For example, starting from the prime meridian and then moving east, zones may be ordered from 1 to 120 for 3-degree zones, wherein the central meridian for zone 1 is 3° east longitude, the central meridian for zone 2 is 6° east longitude, and so on.

Each zone may be associated with a respective Cartesian coordinate system. The projection of the equator on the projection plane acts as the y-axis of the Cartesian coordinate system. The projection of the corresponding central meridian on the projection plane, which is referred to as projection center line in the present disclosure, acts as the x-axis of the Cartesian coordinate system. For example, the projection of 3° east longitude on the projection plane forms the projection center line of zone 1, the projection of 6° east longitude on the projection plane forms the projection center line of zone 2, and so on. The intersection point of the equator and the corresponding central meridian is the origin of the corresponding Cartesian coordinate system. Accordingly, each point in a zone may have its own Cartesian coordinate (x, y). More specifically, localization information (e.g. latitude and longitude) of each point in the earth surface may be converted into a corresponding Cartesian coordinate (x, y) using the Gauss-Krueger projection, wherein the coordinate system of the Cartesian coordinate (x, y) is associated with the zone where the point is located. Such Cartesian coordinate may be used to generate a HD map for use in an automatic driving system.

Figure 2:
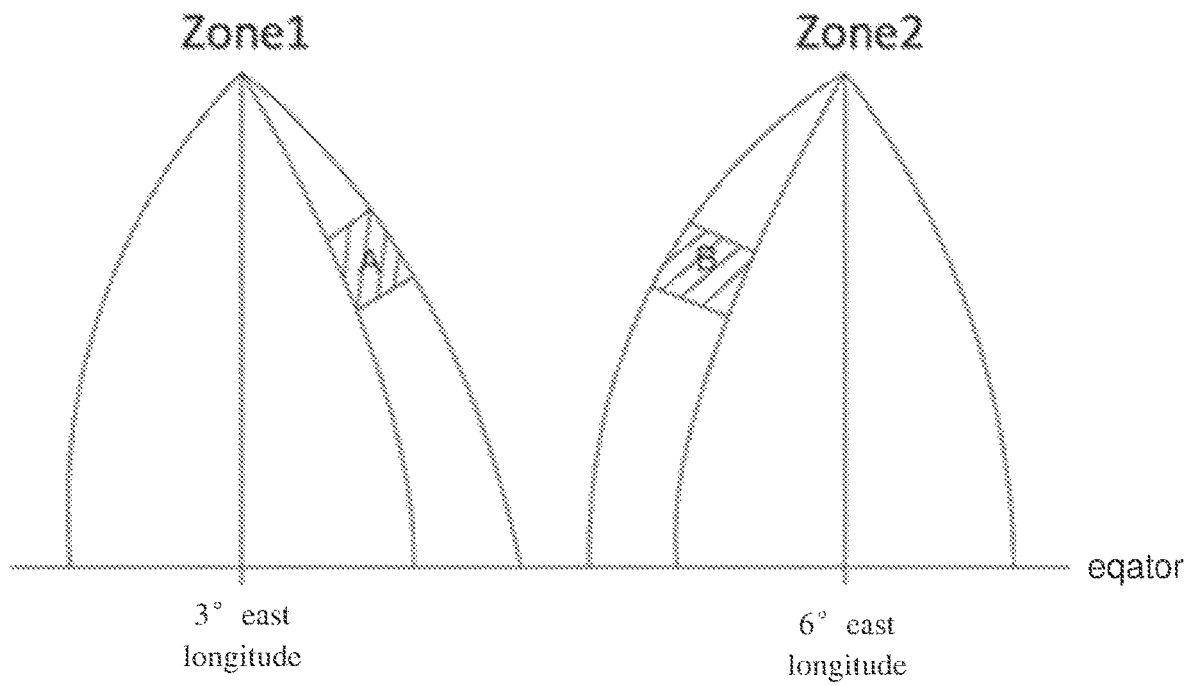
FIG. 2 illustrates two neighboring zones with different projection center lines in accordance with an exemplary embodiment of the present disclosure.

However, as mentioned above, since each zone is associated with a different projection center line and thus is associated with a different Cartesian coordinate system, coordinates of points on the boundary of two neighboring zones are not continuous. FIG. 2 illustrates two neighboring zones with different projection center lines in accordance with an exemplary embodiment of the present disclosure. As shown in FIG. 2, the projection center line for zone 1 is the projection of 3° east longitude on the projection plane, and the projection center line for zone 2 is the projection of 6° east longitude on the projection plane. Area A and area B are two neighboring areas which are geographically close to each other, but are located in zone 1 and zone 2 respectively. Due to the fact that zone 1 and zone 2 are associated with different Cartesian coordinate systems after the Gauss-Krueger projection, coordinates of points in area A are discontinuous with coordinates of points in area B, which may lead to discontinuity and distortion between area A and area B.

Figure 3:
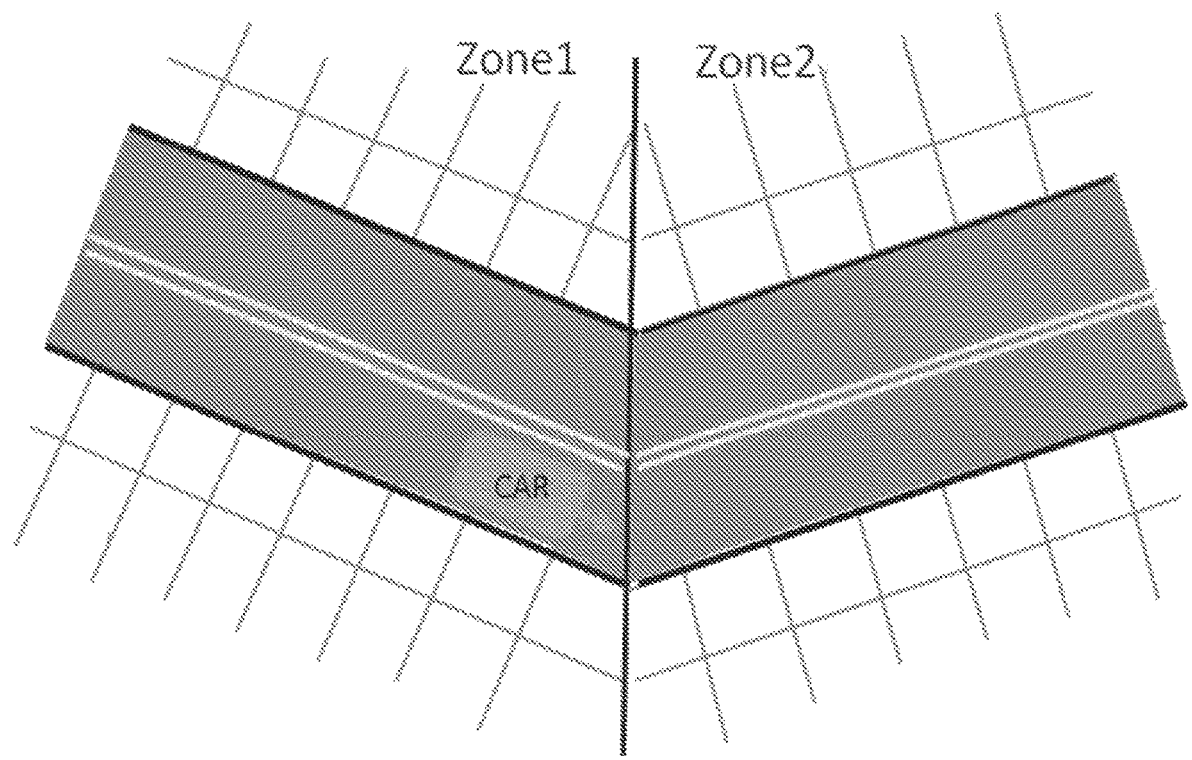
FIG. 3 depicts the distortion at the zone edge in the HD map in accordance with an exemplary embodiment of the present disclosure.

FIG. 3 depicts the distortion at the zone edge in accordance with an exemplary embodiment of the present disclosure. As shown, zone 1 and zone 2 are two neighboring zones which are geographically close to each other. Because zone 1 and zone 2 are associated with different Cartesian coordinate systems, coordinates of points in zone 1 which are close to the zone edge may be discontinuous with coordinates of points in zone 2 which are close to the zone edge. As a result, the road which should be straight at the zone edge may have a sudden direction change at the zone edge. Such distortion or deformation of the digital map may lead to wrong trajectory planning. The present disclosure aims to solve this problem.

When a vehicle is driving on road, it needs to load a new digital map section when the vehicle is only L km (e.g. 5 km) to the current section edge. Additionally, the vehicle needs to output a trajectory planning result that is M km (e.g. 0.3 km<=M<=1.5 km, particularly M=1 km) distance forward and backward its current position. In the present disclosure, a part of the digital map that is within M km from the current vehicle position is referred to as related part of the digital map.

Figure 4A:
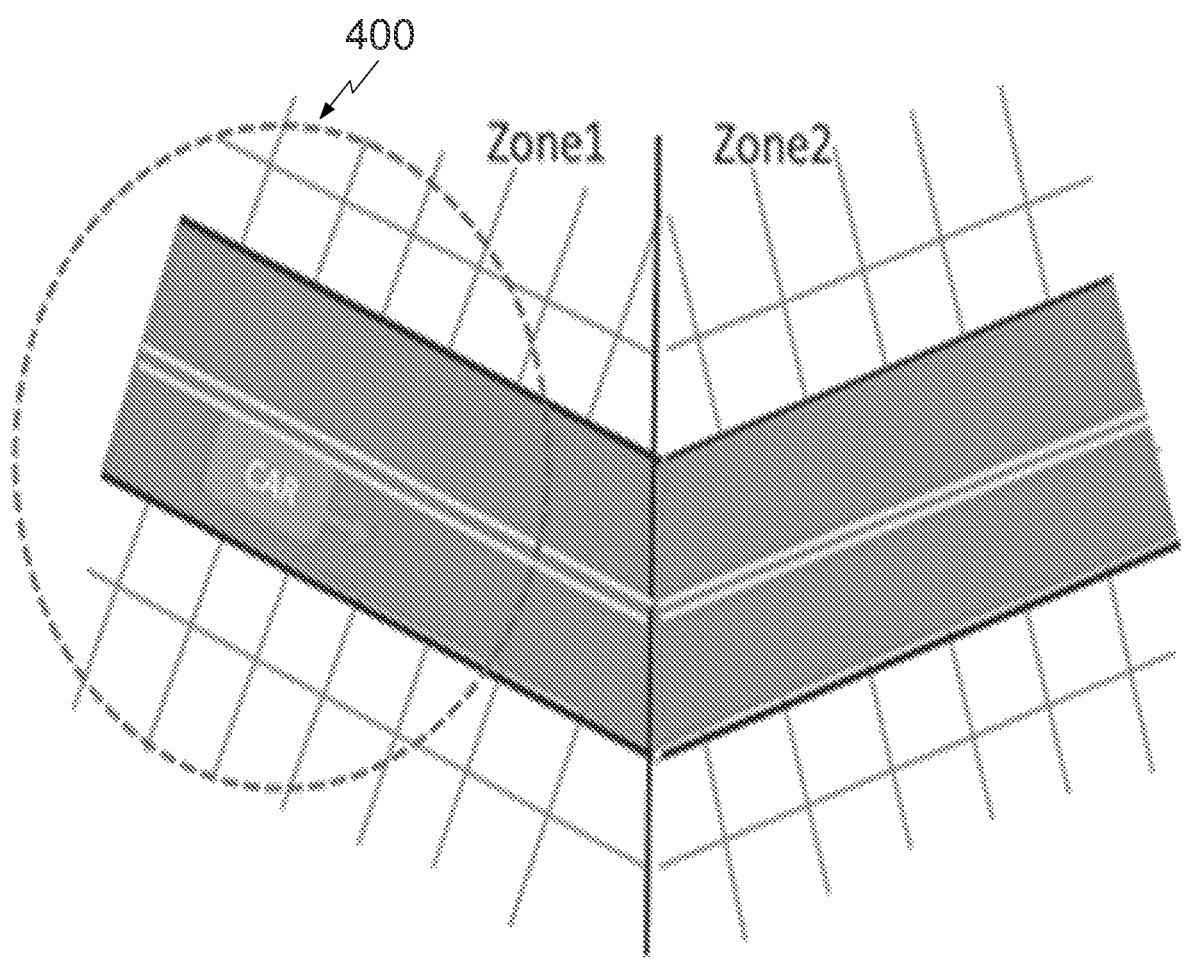
FIGS. 4(A) and (B) illustrate two conditions in loading a related part of the HD map in accordance with an exemplary embodiment of the present disclosure.
Figure 4B:
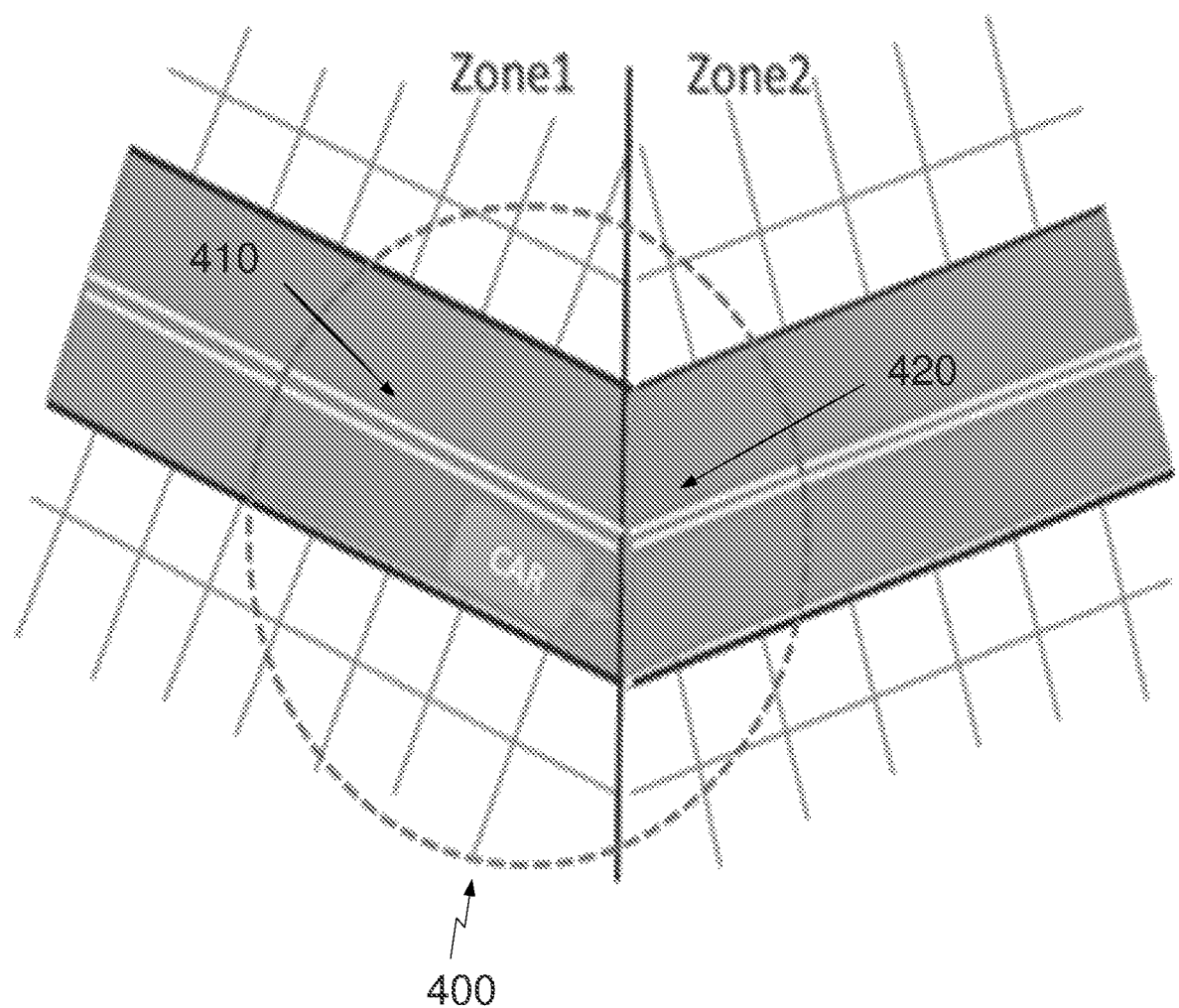

FIGS. 4(A)-(B) illustrate two conditions in loading a related part of the digital map in accordance with an exemplary embodiment of the present disclosure. As shown in FIG. 4 (A), all points in the related part 400 are only in one zone (e.g. zone 1). Therefore, road coordinate information of all points in the related part 400 will be under the same Cartesian coordinate system. The abovementioned distortion problem will not occur in this situation. Thus, the related part 400 can be directly used for trajectory planning without any further processing.

On the other hand, as shown in FIG. 4(B), when the vehicle is moving from zone 1 towards zone 2 and becoming closer to the transition area between zone 1 and zone 2, the related part 400 may include a section 410 in zone 1 and a section 420 in zone 2 (i.e. the related part 400 may include points in both zone 1 and zone 2). As noted above, different projection center lines are used in zone 1 and zone 2 for the Gauss-Krueger projection. Therefore, road coordinate information in the section 410 of the related part 400 may be not continuous with road coordinate information in the section 420 of the related part 400. As a result, distortion may occur at the transition area between zone 1 and zone 2, and the related part 400 cannot be directly used for trajectory planning. In an example of the present disclosure, in order to remove this distortion, road coordinate information in the section 420 of the related part 400 may be transformed (e.g. re-projected) to road coordinate information under the Cartesian coordinate system corresponding to zone 1.

Figure 5A:
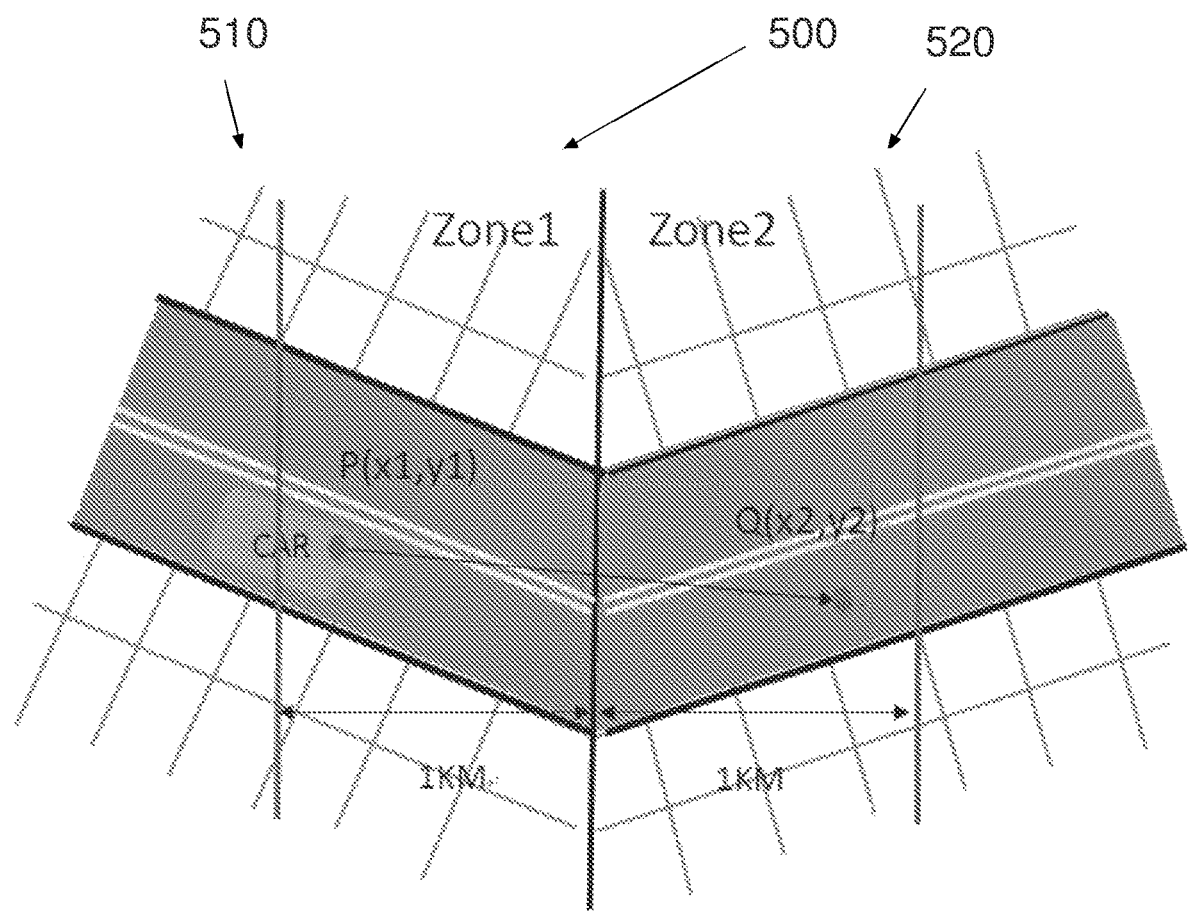
FIGS. 5(A)-(C) depict the transition area of two neighboring zones before and after re-projection in accordance with an exemplary embodiment of the present disclosure.
Figure 5B:
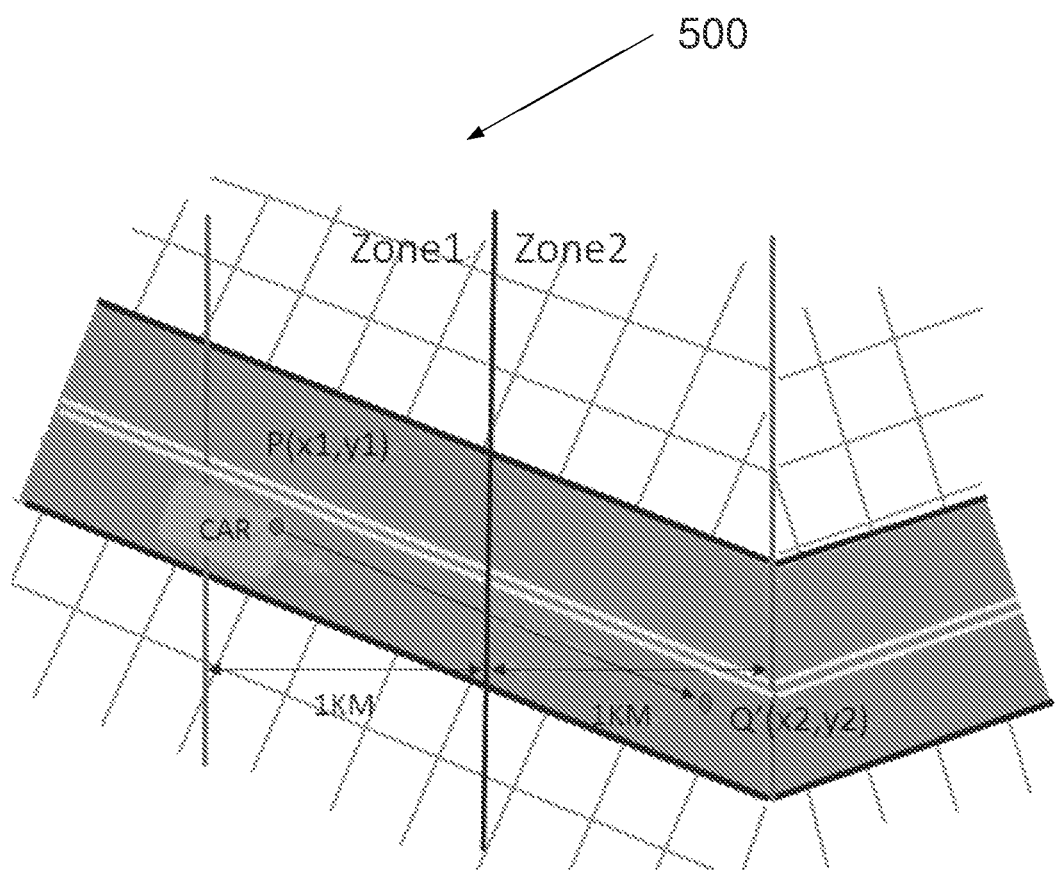
Figure 5C:
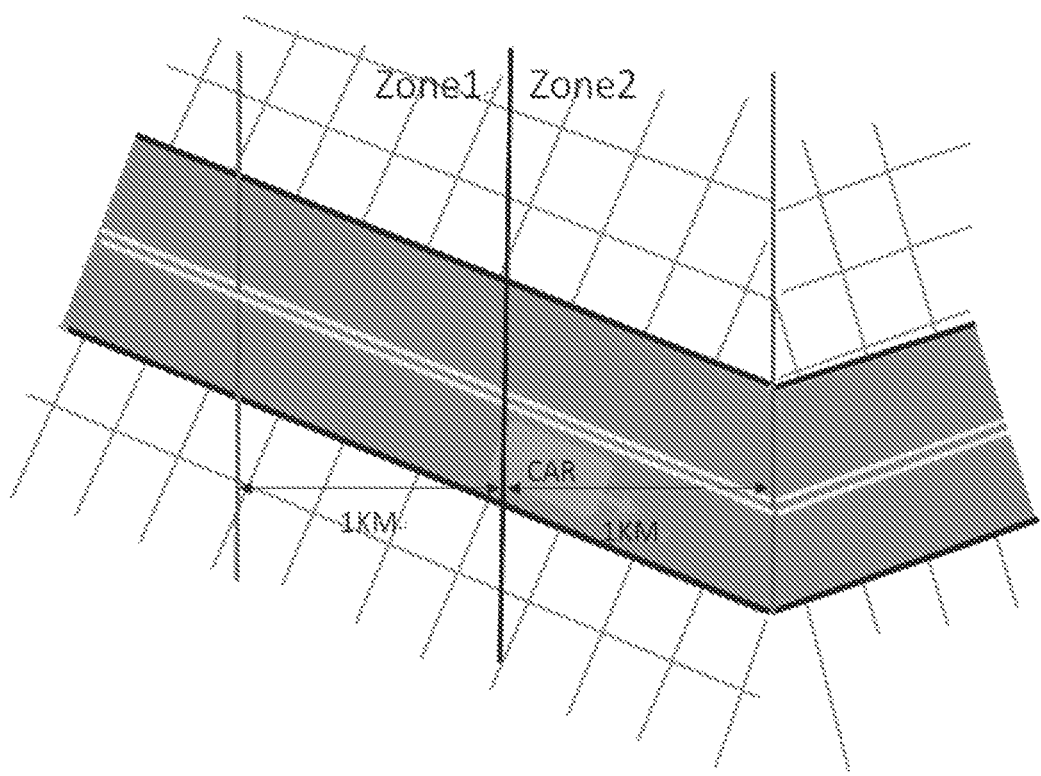

FIGS. 5(A)-(C) depict the transition area before and after re-projection in accordance with an exemplary embodiment of the present disclosure. As shown in FIG. 5(A), the vehicle is located in zone 1 and moves towards zone 2. At this point of time, the vehicle uses the Cartesian coordinate system corresponding to zone 1 for processing road coordinate information. The transition area 500 between zone 1 and zone 2 is enclosed by two vertical lines 510 and 520, which are M km (e.g. 1 km) away from the boundary of zone 1 and zone 2. Point P(x1, y1) which is located in zone 1 represents the current position of the vehicle, and point Q(x2, y2) which is located in zone 2 represents the destination of the trajectory planning. The vector $\overrightarrow{PQ}$ has the original yaw degree θ. However, due to the distortion at the zone edge, the yaw degree θ may be incorrect, resulting in wrong trajectory planning.

In an exemplary embodiment of the present disclosure, coordinate information of points in zone 2 which are located in the transition area may be transformed to coordinate information under the Cartesian coordinate system corresponding to zone 1. For example, the coordinate Q(x2, y2) may be transformed to the coordinate Q'(x2, y2) under the Cartesian coordinate system corresponding to zone 1. This transformation may be achieved by first performing reverse Gauss-Krueger projection on point Q to transform the coordinate of point Q into localization information (e.g. longitude and latitude) and then transforming the localization information of point Q into a Cartesian coordinate using the projection rule associated with zone 1. As used herein, the term "projection rule" refers to using a corresponding projection center line to perform Gauss-Krueger projection. For example, the projection rule associated with zone 1 may refer to using a projection center line of zone 1 to perform Gauss-Krueger projection so as to transform localization information into a Cartesian coordinate under the Cartesian coordinate system corresponding to zone 1. The conversion between the localization information and the Cartesian coordinate using the Gauss-Krueger projection and/or the reverse Gauss-Krueger projection is well known in the art and is not described in detail herein.

With reference to FIG. 5(B), after the transformation, all road coordinate information in the transition area 500 is associated with the Cartesian coordinate system corresponding to zone 1. The yaw degree of vector $\overrightarrow{PQ}$ will also be updated as θ. In this way, road information in the digital map becomes smooth in the transition area and can be used for trajectory planning.

With reference to FIG. 5(C), the vehicle is now located in zone 2 and back towards zone 1 (i.e. moving away from zone 1), but is still in the transition area. At this time, the vehicle still uses the Cartesian coordinate system corresponding to zone 1 for processing road coordinate information. The road coordinate information in the transition area is transformed to road coordinate information associated with the Cartesian coordinate system corresponding to zone 1, so that deformation in the transition area can be corrected.

Figure 6:
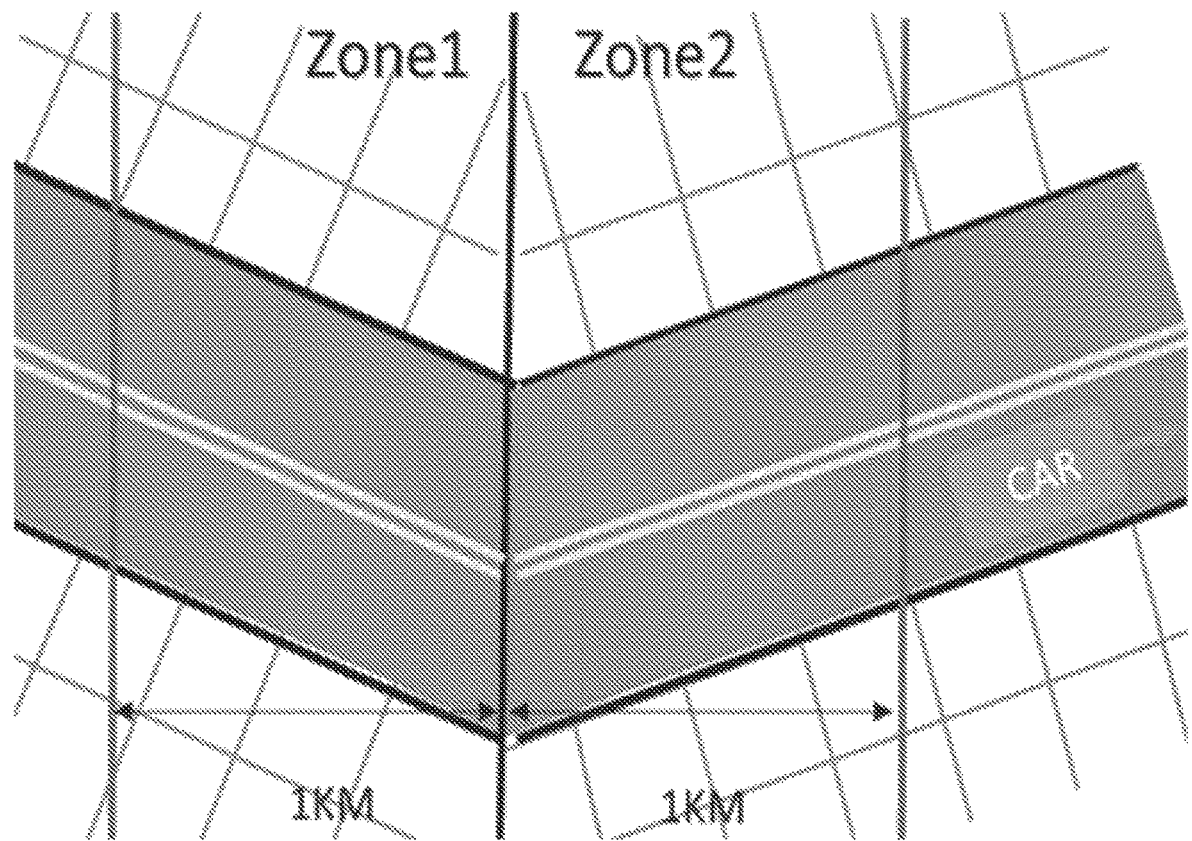
FIG. 6 depicts the digital map after the vehicle leaves the transition area of two neighboring zones in accordance with an exemplary embodiment of the present disclosure.

Next, reference is made to FIG. 6, after the vehicle drives away from the transition area, the related part only belongs to zone 2. The transformed road coordinate information in zone 2 is converted back to original road coordinate information and the vehicle transitions to use the Cartesian coordinate system corresponding to zone 2 for processing road coordinate information.

Figure 7:
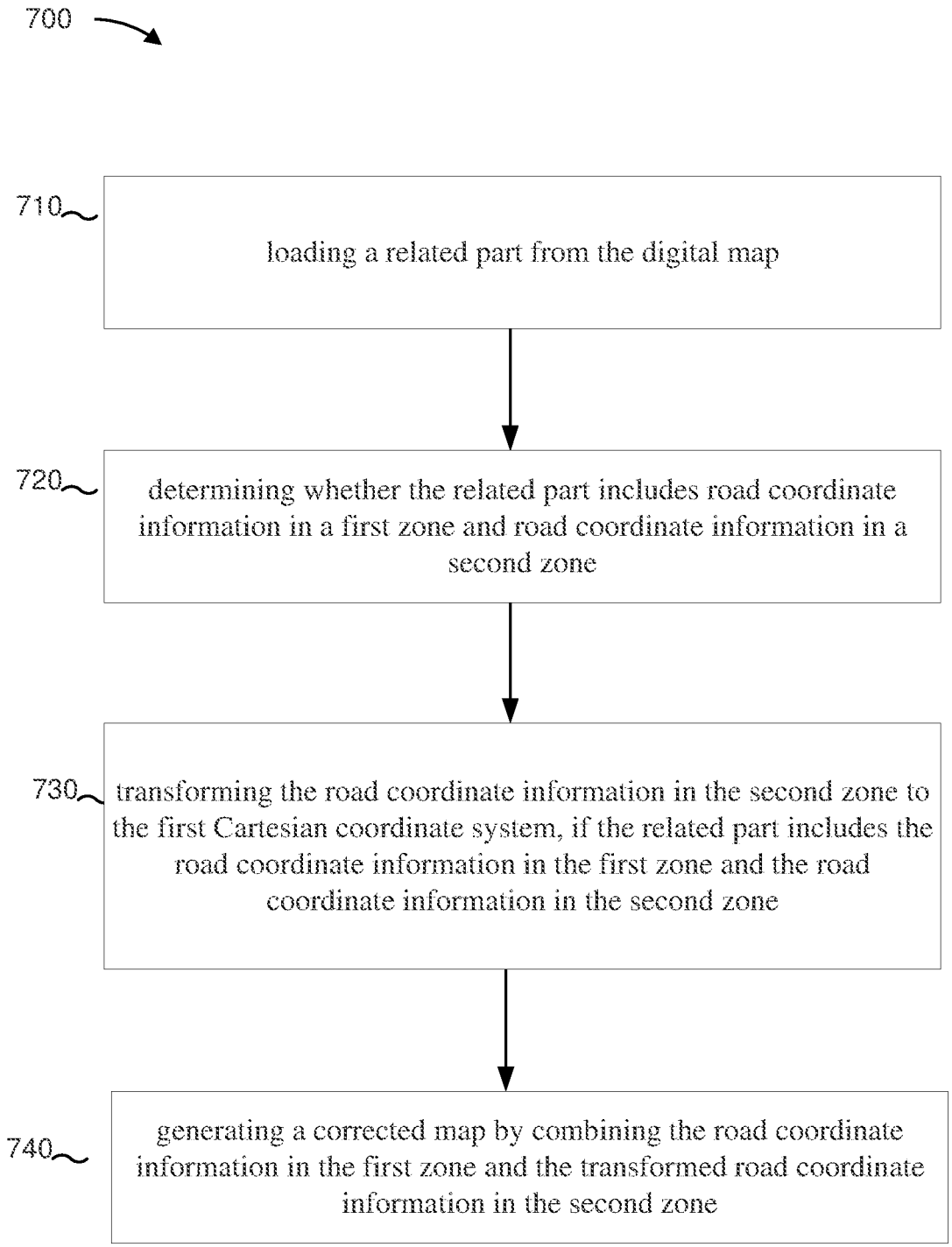
FIG. 7 illustrates a flowchart of an exemplary method for correcting deformation of a digital map for a vehicle in accordance with an exemplary embodiment of the present disclosure.

FIG. 7 illustrates a flowchart of an exemplary method 700 for correcting deformation of a digital map for a vehicle in accordance with an exemplary embodiment of the present disclosure. For example, the method 700 may be implemented within at least one processing circuit (e.g., the processor 904 of FIG. 9), which may be located in an on-vehicle computer system, a remote server, some other suitable apparatus, or a combination of these apparatuses. Of course, in various aspects within the scope of the disclosure, the method 700 may be implemented by any suitable apparatus or apparatuses capable of supporting related operations.

At block 710, the method 700 may comprise loading a related part from a digital map. For example, the digital map may be stored in an on-vehicle system or a remote server. The digital map may be a high definition digital map. In an example, the digital map may include a plurality of zones which are obtained using zone-dividing of Gauss-Krueger projection. In an example, the related part may comprise a part of the digital map that is within M km from the vehicle. M may be in the range of between 0.3 km and 1.5 km, and particularly M is equal to 1 km. Such related part may be used for trajectory planning in an automatic driving system.

At block 720, the method 700 may comprise determining whether the related part includes road coordinate information in a first zone and road coordinate information in a second zone, wherein the road coordinate information in the first zone is associated with a first Cartesian coordinate system and the road coordinate information in the second zone is associated with a second Cartesian coordinate system, and wherein the first Cartesian coordinate system is the coordinate system of the vehicle which is now used for processing the road coordinate information. As used herein, the terms "first zone" and "second zone" are only used to distinguish two zones and are not intended to refer to a particular zone. In an example, the digital map may comprise a map description file which comprises a coordinate of each coordinate point in the digital map and a zone number indicating which zone the coordinate point is located in. The determination may be made by checking the zone number of each coordinate point in the related part. In an example, if it is determined that the related part only includes road coordinate information in one zone (e.g. in the first zone), then the current road coordinate information can be directly used for trajectory planning. In another example, if it is determined that the related part includes road coordinate information in the first zone and road coordinate information in the second zone, then the related part needs to be further processed.

At block 730, the method 700 may comprise transforming the road coordinate information in the second zone to the first Cartesian coordinate system, if the related part includes the road coordinate information in the first zone and the road coordinate information in the second zone. In an example, the transformation may comprise transforming the road coordinate information in the second zone into localization information using a reverse Gauss-Krueger projection, and transforming the localization information into road coordinate information associated with the first Cartesian coordinate system using a Gauss-Krueger projection. In an example, the localization information may comprise longitude and latitude information.

At block 740, the method 700 may comprise generating a corrected map by combining the road coordinate information in the first zone and the transformed road coordinate information in the second zone. The corrected map may then be used for trajectory planning.

In the case of the movement of the vehicle from the first zone towards the second zone, as the vehicle moves, if the related part no longer comprises road coordinate information in the first zone, the transformed road coordinate information in the second zone is converted back to original road coordinate information and the vehicle transitions to use the second Cartesian coordinate system for processing road coordinate information.

Using the method 700, the deformation of the transition area of neighboring zones in the digital map can be corrected. The accuracy of the digital map will be maximized both inside and outside the transition area of neighboring zones. Road information in the digital map will be smooth when driving vehicles across different zones.

Figure 8:
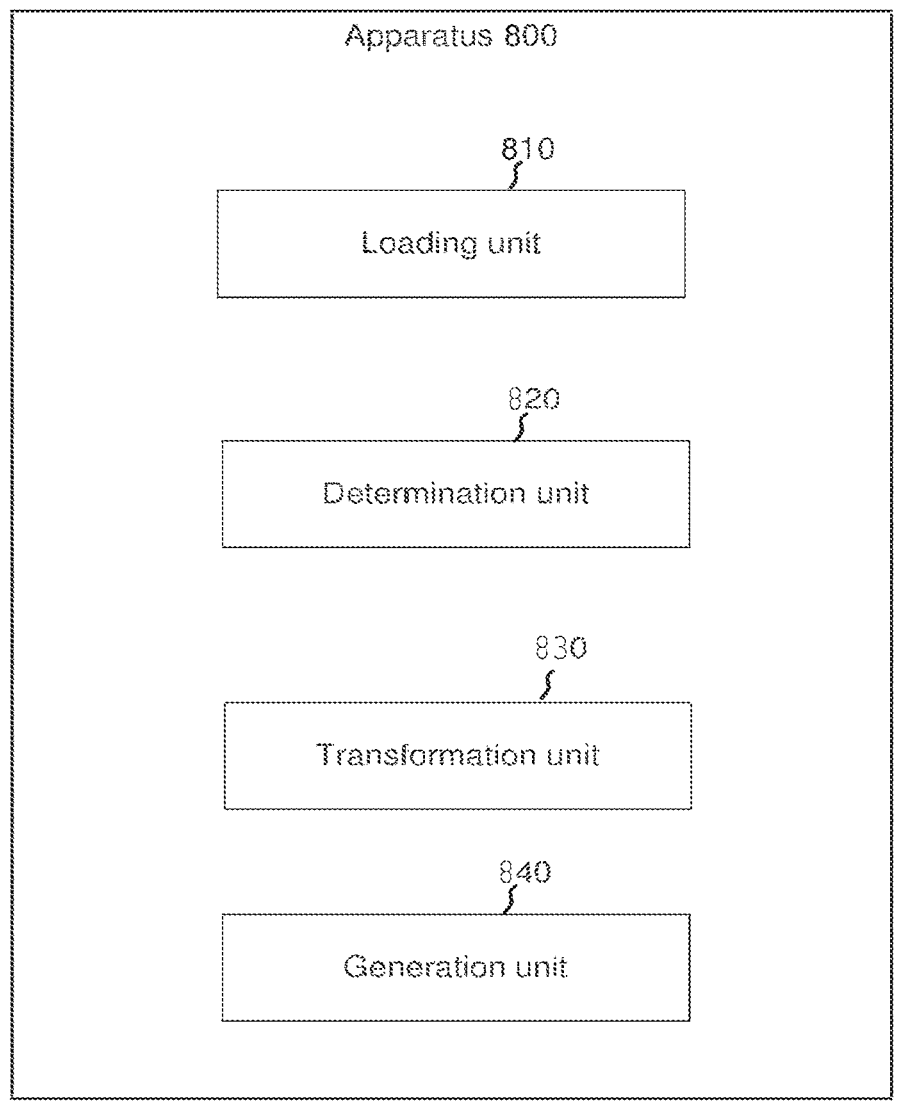
FIG. 8 illustrates a block diagram of an exemplary apparatus for correcting deformation of a digital map for a vehicle in accordance with an exemplary embodiment of the present disclosure.

FIG. 8 illustrates a block diagram of an exemplary apparatus 800 for correcting deformation of a digital map for a vehicle in accordance with an exemplary embodiment of the present disclosure. All the functional blocks of the apparatus 800 (various units included in the apparatus 800, whether shown or not shown in the figure) may be implemented by hardware, software, or a combination of hardware and software to carry out the principles of the invention. It is understood by those skilled in the art that the functional blocks described in FIG. 8 may be combined or separated into sub-blocks to implement the principles of the invention as described above. Therefore, the description herein may support any possible combination or separation or further definition of the functional blocks described herein.

As shown in FIG. 8, according to an exemplary embodiment of the present disclosure, the apparatus 800 may comprise a loading unit 810 configured to load a related part from the digital map; a determination unit 820 configured to determine whether the related part includes road coordinate information in a first zone and road coordinate information in a second zone, wherein the road coordinate information in the first zone is associated with a first Cartesian coordinate system and the road coordinate information in the second zone is associated with a second Cartesian coordinate system, wherein the first Cartesian coordinate system is the coordinate system of the vehicle for processing the road coordinate information; a transformation unit 830 configured to transform the road coordinate information in the second zone to the first Cartesian coordinate system, if the related part includes the road coordinate information in the first zone and the road coordinate information in the second zone; and a generation unit 840 configured to generate a corrected map by combining the road coordinate information in the first zone and the transformed road coordinate information in the second zone.

Figure 9:
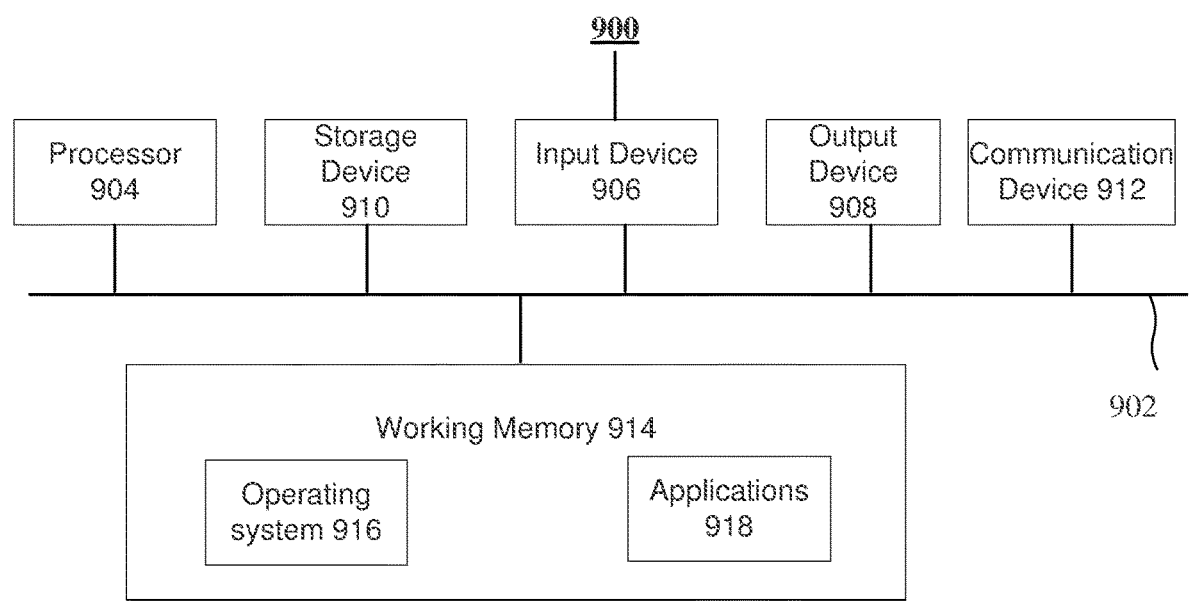
FIG. 9 illustrates a general hardware environment wherein the present disclosure is applicable in accordance with an exemplary embodiment of the present disclosure.

FIG. 9 illustrates a general hardware environment 900 wherein the present disclosure is applicable in accordance with an exemplary embodiment of the present disclosure.

With reference to FIG. 9, a computing device 900, which is an example of the hardware device that may be applied to the aspects of the present disclosure, will now be described. The computing device 900 may be any machine configured to perform processing and/or calculations, may be but is not limited to a work station, a server, a desktop computer, a laptop computer, a tablet computer, a personal data assistant, a smart phone, an on-vehicle computer or any combination thereof. The aforementioned apparatus 800 may be wholly or at least partially implemented by the computing device 900 or a similar device or system.

The computing device 900 may comprise elements that are connected with or in communication with a bus 902, possibly via one or more interfaces. For example, the computing device 900 may comprise the bus 902, and one or more processors 904, one or more input devices 906 and one or more output devices 908. The one or more processors 904 may be any kinds of processors, and may comprise but are not limited to one or more general-purpose processors and/or one or more special-purpose processors (such as special processing chips). The input devices 906 may be any kinds of devices that can input information to the computing device, and may comprise but are not limited to a mouse, a keyboard, a touch screen, a microphone and/or a remote control. The output devices 908 may be any kinds of devices that can present information, and may comprise but are not limited to display, a speaker, a video/audio output terminal, a vibrator and/or a printer. The computing device 900 may also comprise or be connected with non-transitory storage devices 910 which may be any storage devices that are non-transitory and can implement data stores, and may comprise but are not limited to a disk drive, an optical storage device, a solid-state storage, a floppy disk, a flexible disk, hard disk, a magnetic tape or any other magnetic medium, a compact disc or any other optical medium, a ROM (Read Only Memory), a RAM (Random Access Memory), a cache memory and/or any other memory chip or cartridge, and/or any other medium from which a computer may read data, instructions and/or code. The non-transitory storage devices 910 may be detachable from an interface. The non-transitory storage devices 910 may have data/instructions/code for implementing the methods and steps which are described above. The computing device 900 may also comprise a communication device 912. The communication device 912 may be any kinds of device or system that can enable communication with external apparatuses and/or with a network, and may comprise but are not limited to a modem, a network card, an infrared communication device, a wireless communication device and/or a chipset such as a Bluetooth™ device, 1302.11 device, WiFi device, WiMax device, cellular communication facilities and/or the like.

When the computing device 900 is used as an on-vehicle device, it may also be connected to external device, for example, a GPS receiver, sensors for sensing different environmental data such as an acceleration sensor, a wheel speed sensor, a gyroscope and so on. In this way, the computing device 900 may, for example, receive location data and sensor data indicating the travelling situation of the vehicle. When the computing device 900 is used as an on-vehicle device, it may also be connected to other facilities (such as an engine system, a wiper, an anti-lock Braking System or the like) for controlling the traveling and operation of the vehicle.

In addition, the non-transitory storage device 910 may have map information and software elements so that the processor 904 may perform route guidance processing. In addition, the output device 906 may comprise a display for displaying the map, the location mark of the vehicle and also images indicating the travelling situation of the vehicle. The output device 906 may also comprise a speaker or interface with an ear phone for audio guidance.

The bus 902 may include but is not limited to Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Particularly, for an on-vehicle device, the bus 902 may also include a Controller Area Network (CAN) bus or other architectures designed for application on an automobile.

The computing device 900 may also comprise a working memory 914, which may be any kind of working memory that may store instructions and/or data useful for the working of the processor 904, and may comprise but is not limited to a random access memory and/or a read-only memory device.

Software elements may be located in the working memory 914, including but are not limited to an operating system 916, one or more application programs 918, drivers and/or other data and codes. Instructions for performing the methods and steps described in the above may be comprised in the one or more application programs 918, and the units of the aforementioned apparatus 800 may be implemented by the processor 904 reading and executing the instructions of the one or more application programs 918. More specifically, the loading unit 810 of the aforementioned apparatus 800 may, for example, be implemented by the processor 904 when executing an application 918 having instructions to perform the block 710. In addition, the determination unit 820 of the aforementioned apparatus 800 may, for example, be implemented by the processor 904 when executing an application 918 having instructions to perform the block 720. Other units of the aforementioned apparatus 800 may also, for example, be implemented by the processor 904 when executing an application 918 having instructions to perform one or more of the aforementioned respective steps. The executable codes or source codes of the instructions of the software elements may be stored in a non-transitory computer-readable storage medium, such as the storage device(s) 910 described above, and may be read into the working memory 914 possibly with compilation and/or installation. The executable codes or source codes of the instructions of the software elements may also be downloaded from a remote location.

Those skilled in the art may clearly know from the above embodiments that the present disclosure may be implemented by software with necessary hardware, or by hardware, firmware and the like. Based on such understanding, the embodiments of the present disclosure may be embodied in part in a software form. The computer software may be stored in a readable storage medium such as a floppy disk, a hard disk, an optical disk or a flash memory of the computer. The computer software comprises a series of instructions to make the computer (e.g., a personal computer, a service station or a network terminal) execute the method or a part thereof according to respective embodiment of the present disclosure.

Reference has been made throughout this specification to "one example" or "an example", meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method for correcting deformation of a digital map for a vehicle moving from a first zone towards a second zone, the method comprising:
    loading a related part from the digital map, wherein
        the related part comprises all digital map information relating to a geographical area within a radius of M km from the vehicle;
    determining that the related part only includes road coordinate information in the first zone by checking a map description file of the digital map, and in response:
        directly using road coordinate information in the first zone, wherein
            the road coordinate information in the first zone is associated with a first Cartesian coordinate system, and
            an automatic driving system of the vehicle uses the first Cartesian coordinate system to process road coordinate information;
    determining, by checking the map description file, that the related part includes road coordinate information in the first zone and road coordinate information in the second zone associated with a second Cartesian coordinate system thus creating a distortion at an edge between the first zone and the second zone, and in response:
        transforming the road coordinate information in the second zone to the first Cartesian coordinate system, and
        generating a corrected digital map by combining the road coordinate information in the first zone and the transformed road coordinate information in the second zone, wherein
            the automatic driving system of the vehicle uses the first Cartesian coordinate system to process road coordinate information; and during movement of the vehicle from the first zone toward the second zone, determining that the related part only includes road coordinate information in the second zone, and in response:
converting back the transformed road coordinate information in the second zone to original road coordinate information, wherein
the automatic driving system of the vehicle transitions to use the second Cartesian coordinate system to process localization and trajectory planning.

2. The method according to claim 1, wherein the step of transforming the road coordinate information in the second zone to the first Cartesian coordinate system comprises:
transforming the road coordinate information in the second zone into localization information using a reverse Gauss-Krueger projection; and
transforming the localization information into road coordinate information associated with the first Cartesian coordinate system using a Gauss-Krueger projection.

3. The method according to claim 2, wherein the localization information comprises longitude and latitude information.

4. The method according to claim 1, wherein
the map description file comprises a coordinate of each coordinate point in the digital map and a zone number indicating which zone the coordinate point is located in.

5. The method according to claim 4, wherein the step of determining whether the related part includes road coordinate information in the first zone and/or road coordinate information in the second zone comprises:
determining whether the related part only includes road coordinate information in the first zone, includes road coordinate information in the first zone and road coordinate information in the second zone, or only includes road coordinate information in the second zone by checking the zone number of each coordinate point in the related part.

6. The method according to claim 1, wherein
0.3 km<=M<=1.5 km.

7. A non-transitory machine readable storage medium having instructions stored thereon that, when executed, cause a processor to implement the method according to claim 1.

8. An apparatus for correcting deformation of a digital map for a vehicle moving from a first zone towards a second zone, the apparatus comprising:
a processor;
a memory coupled to the processor and storing instructions, when executed by the processor, configure the processor to implement:
a loading unit configured to load a related part from the digital map, wherein
the related part comprises all digital map information relating to a geographical area within a radius of M km from the vehicle;
a determination unit configured to determine whether the related part includes road coordinate information in the first zone and/or road coordinate information in the second zone by checking a map description file of the digital map, wherein
if it is determined that the related part only includes road coordinate information in the first zone:
directly use road coordinate information in the first zone, wherein
the road coordinate information in the first zone is associated with a first Cartesian coordinate system,
an automatic driving system of the vehicle uses the first Cartesian coordinate system to process road coordinate information, and
the road coordinate information in the second zone is associated with a second Cartesian coordinate system;
if it is determined that the related part includes road coordinate information in the first zone and road coordinate information in the second zone associated with a second Cartesian coordinate system thus creating a distortion at an edge between the first zone and the second zone:
transform the road coordinate information in the second zone to the first Cartesian coordinate system, and
generate a corrected map by combining the road coordinate information in the first zone and the transformed road coordinate information in the second zone, wherein
the automatic driving system of the vehicle uses the first Cartesian coordinate system to process road coordinate information; and
if it is determined that the related part only includes road coordinate information in the second zone:
convert back the transformed road coordinate information in the second zone to original road coordinate information, wherein
the automatic driving system of the vehicle transitions to use the second Cartesian coordinate system to process localization and trajectory planning.

9. A vehicle comprising the apparatus according to claim 8.

10. The apparatus according to claim 8, wherein
0.3 km<=M<=1.5 km.

11. The apparatus according to claim 8, wherein p1 the map description file comprises a coordinate of each coordinate point in the digital map and a zone number indicating which zone the coordinate point is located in.

12. The apparatus according to claim 11, wherein determination of whether the related part includes road coordinate information in the first zone and/or road coordinate information in the second zone comprises:
determining whether the related part only includes road coordinate information in the first zone, includes road coordinate information in the first zone and road coordinate information in the second zone, or only includes road coordinate information in the second zone by checking the zone number of each coordinate point in the related part.

13. An apparatus for correcting deformation of a digital map for a vehicle located in a second zone and moving back toward a first zone, the apparatus comprising:
a processor;
a memory coupled to the processor and storing instructions, when executed by the processor, configure the processor to implement:
a loading unit configured to load a related part from the digital map, wherein
the related part comprises all digital map information relating to a geographical area within a radius of M km from the vehicle;
a determination unit configured to determine whether the related part includes road coordinate information in the first zone and/or road coordinate information in the second zone by checking a map description file of the digital map, wherein
if it is determined that the related part only includes road coordinate information in the first zone:
directly use road coordinate information in the first zone, wherein
the road coordinate information in the first zone is associated with a first Cartesian coordinate system,
an automatic driving system of the vehicle uses the first Cartesian coordinate system to process road coordinate information, and
the road coordinate information in the second zone is associated with a second Cartesian coordinate system;
if it is determined that the related part includes road coordinate information in the first zone and road coordinate information in the second zone associated with a second Cartesian coordinate system thus creating a distortion at an edge between the first zone and the second zone:
transform the road coordinate information in the second zone to the first Cartesian coordinate system, and
generate a corrected digital map by combining the road coordinate information in the first zone and the transformed road coordinate information in the second zone, wherein
the automatic driving system of the vehicle uses the first Cartesian coordinate system to process road coordinate information; and
during movement of the vehicle from the first zone toward the second zone, if it is determined that the related part only includes road coordinate information in the second zone:
convert back the transformed road coordinate information in the second zone to original road coordinate information, wherein
the automatic driving system of the vehicle transitions to use the second Cartesian coordinate system to process localization and trajectory planning.

14. The apparatus according to claim 13, wherein $0.3 \text{ km} <= M <= 1.5 \text{ km}$.

15. The apparatus according to claim 13, wherein the map description file comprises a coordinate of each coordinate point in the digital map and a zone number indicating which zone the coordinate point is located in.

16. The apparatus according to claim 15, wherein determination of whether the related part includes road coordinate information in the first zone and/or road coordinate information in the second zone comprises:
determining whether the related part only includes road coordinate information in the first zone, includes road coordinate information in the first zone and road coordinate information in the second zone, or only includes road coordinate information in the second zone by checking the zone number of each coordinate point in the related part.

* * * * *